(12) United States Patent
Jain et al.

(10) Patent No.: US 12,353,292 B2
(45) Date of Patent: Jul. 8, 2025

(54) RECOVERY OF RETIRED MEMORY BLOCKS IN A MEMORY DEVICE

(71) Applicant: Sandisk Technologies, Inc., Milpitas, CA (US)

(72) Inventors: Nitin Jain, Bengaluru (IN); Maharudra Nagnath Swami, Bengaluru (IN); Naveen Menezes, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 71 days.

(21) Appl. No.: 18/357,746

(22) Filed: Jul. 24, 2023

(65) Prior Publication Data

US 2024/0330117 A1    Oct. 3, 2024

Related U.S. Application Data

(60) Provisional application No. 63/492,420, filed on Mar. 27, 2023.

(51) Int. Cl.
*G06F 11/14* (2006.01)

(52) U.S. Cl.
CPC .................. *G06F 11/1458* (2013.01)

(58) Field of Classification Search
CPC ......... G06F 11/1458; G06F 2212/7205; G06F 12/0246
See application file for complete search history.

(56) References Cited

U.S. PATENT DOCUMENTS

| | | | | |
|---|---|---|---|---|
| 11,983,080 | B2* | 5/2024 | Sun | G06F 3/0619 |
| 2003/0163721 | A1* | 8/2003 | Hildenbrand, Jr. | H04L 63/08 726/7 |
| 2017/0091035 | A1* | 3/2017 | Kazi | H03M 13/154 |
| 2018/0081817 | A1* | 3/2018 | Turner | G06F 12/0815 |
| 2018/0107550 | A1* | 4/2018 | Dhuse | G06F 3/067 |
| 2021/0012851 | A1* | 1/2021 | Huang | G11C 29/886 |

* cited by examiner

*Primary Examiner* — Matthew M Kim
*Assistant Examiner* — Matthew N Putaraksa
(74) *Attorney, Agent, or Firm* — DENTONS Durham Jones Pinegar (57) ABSTRACT

A memory block recovery process is used to review and recover memory blocks of a memory device that have potentially been misidentified as bad blocks. The memory block recovery process is initiated when a threshold number of entries in a failed memory block list is exceeded. During the memory block recovery process, the failed memory block list is analyzed to determine whether there is any correlation between memory blocks that failed programming operations and memory blocks that were programmed prior to the memory block failing its programming operation. If there is a correlation, an independent program operation is performed on each memory block that failed its programming operation. If the independent programming operation on the memory block is successful, the memory block is reclaimed and the prior programmed memory block is identified as a bad block.

20 Claims, 7 Drawing Sheets

| ENTRIES | FAILED MEMORY BLOCK LIST | | 
|---|---|---|
| | PREVIOUSLY PROGRAMMED BLOCK | FAILED BLOCK |
| 0 | FIM0-D0-P0 MB2 | FIM0-D0-P0 MB5 |
| 1 | | |
| 2 | | |
| 3 | | |
| N | | |

| RETIRED BLOCK LIST |
|---|
| FIM0-D0-P0 MB5 |
| |
| |
| |
| |

FIG. 4A

| ENTRIES | FAILED MEMORY BLOCK LIST | |
|---|---|---|
| | PREVIOUSLY PROGRAMMED BLOCK | FAILED BLOCK |
| 0 | FIM0-D0-P0 MB2 | FIM0-D0-P0 MB5 |
| 1 | FIM0-D0-P0 MB0 | FIM0-D0-P0 MB1 |
| 2 | FIM0-D0-P0 MB2 | FIM0-D0-P0 MBN-1 |
| 3 | FIM0-D0-P0 MB3 | FIM0-D0-P0 MBN-2 |
| N | FIM0-D0-P0 MB4 | FIM0-D0-P0 MBN |

| RETIRED BLOCK LIST |
|---|
| FIM0-D0-P0 MB5 |
| FIM0-D0-P0 MB1 |
| FIM0-D0-P0 MBN-1 |
| FIM0-D0-P0 MBN-2 |
| FIM0-D0-P0 MBN |

FIG. 4B

| RETIRED BLOCK LIST |
|---|
| FIM0-D0-P0 MB1 |
| FIM0-D0-P0 MBN-1 |
| FIM0-D0-P0 MBN-2 |
| FIM0-D0-P0 MBN |
| FIM0-D0-P0 MB2 |

RECOVERY OF RETIRED MEMORY BLOCKS IN A MEMORY DEVICE

CROSS-REFERENCE TO RELATED APPLICATIONS

The present application claims priority to U.S. Provisional Application No. 63/492,420 entitled "RECOVERY OF RETIRED MEMORY BLOCKS IN A MEMORY DEVICE", filed Mar. 27, 2023, the entire disclosure of which is hereby incorporated by reference in its entirety.

BACKGROUND

A non-volatile storage device typically includes multiple memory dies. In some examples, the memory dies are grouped together for increased performance. For example, a memory die includes a number of different memory blocks and a memory block from each memory die may be grouped to form a metablock. Each memory block in a metablock may be accessed in parallel to optimize performance of the non-volatile storage device.

Over time, memory blocks associated with various metablocks may begin to fail. When a memory block of a particular metablock fails, the memory block is identified as a bad block and is no longer used. However, there may be times when a memory block is incorrectly identified as a bad block. If multiple memory blocks are incorrectly identified as bad blocks, the non-volatile storage device may reach its end of life sooner than expected.

Accordingly, it would be beneficial to identify whether memory blocks have been incorrectly identified as bad blocks and recover those memory blocks. Further, it would be beneficial to determine why those memory blocks were incorrectly identified as bad blocks and take additional actions to help ensure additional memory blocks are not incorrectly identified as bad blocks in the future.

SUMMARY

The present application describes systems and methods for reviewing and/or recovering memory blocks in memory dies and/or memory devices that have been identified as bad memory blocks. In some examples, the memory blocks that are identified as bad memory blocks may be reviewed and/or recovered based on certain conditions. For example, a particular memory block may be misidentified as a bad memory block due to an issue or problem with a memory block that was programmed prior to or is otherwise associated with the particular memory block.

In order to address the above, when a first memory block (also referred to herein as a currently programmed memory block) is identified as a bad memory block, an identifier (e.g., a physical address) of the first memory block is stored as an entry in a failed memory block list. In addition, an identifier or address of a second memory block (also referred to herein as a previously programmed memory block) that was programmed prior to the first memory block is also stored as an entry in the failed memory block list. The second memory block is also identified as being related to or otherwise being associated with the first memory block.

When a threshold number of entries in the failed memory block list has been reached, a memory block reclamation or recovery process is initiated. During the memory block recovery process, the failed memory block list is analyzed to determine whether there is any correlation between any of the first memory blocks (e.g., any of the currently programmed memory blocks) and any of the second memory blocks (e.g., any of the previously programmed memory blocks). If there is a correlation (e.g., multiple first memory blocks are associated with the same second memory block), an independent program operation is performed on each first memory block in the failed memory block list that is associated with the same second memory block.

If the independent program operation on the first memory block is successful, the first memory block is identified as a good memory block and is recovered/reclaimed. The second memory block is then identified as a bad memory block. Any data stored by the second memory block is transferred to another memory block and the second memory block is retired.

Accordingly, the present application describes a method for reclaiming or recovering a bad memory block in a memory device. In an example, the method includes identifying a currently programmed memory block in a memory device and a previously programmed memory block in the memory device. In an example, the previously programmed memory block is associated with the currently programmed memory block. Based on detecting a program failure on the currently programmed memory block, a first memory block identifier associated with the currently programmed memory block is stored as an entry in a failed memory block list and the currently programmed memory block is identified as a failed memory block. Additionally, a second memory block identifier associated with the previously programmed memory block is added as an entry in the failed memory block list. Based on determining that a number of entries in the failed memory block list exceed a threshold, a determination is made as to whether the second memory block identifier associated with the previously programmed memory block is included in the failed memory block list multiple times. Based on determining the second memory block identifier associated with the previously programmed memory block is included in the failed memory block list multiple times, a memory block recovery process on the currently programmed memory block is initiated.

The present application also describes a data storage device. In an example, the data storage device includes one or more memory dies and a controller communicatively coupled to the one or more memory dies. The controller is operable to identify a first memory block of the one or more memory dies and a second memory block of the one or more memory dies. In an example, the first memory block and the second memory block are associated with each other based, at least in part, on a programming operation. The controller is operable to detect a failure of the programming operation on the first memory block. Based on detecting the failure, the controller causes a first identifier associated with the first memory block and a second identifier associated with the second memory block to be stored as an entry in a list of failed memory blocks. Additionally, the controller causes the first memory block to be identified as a failed memory block. When a number of entries in the list of failed memory blocks exceed a threshold, the controller determines whether the second identifier associated with the second memory block is included in the list of failed memory blocks multiple times. If it is determined that the second memory block identifier associated with the previously programmed memory block is included in the list of failed memory blocks multiple times, a memory block recovery process is initiated on the first memory block.

A non-volatile storage device is also described. In an example, the non-volatile storage device includes one or more memory dies and a means for initiating a memory recovery process on a first memory means associated with the one or more memory dies and a second memory means associated with the one or more memory dies. In an example, the memory recovery process is based, at least in part, on a determination that each of the first memory means and the second memory means failed a programming operation after being associated with a third memory means.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

Examples described herein are directed to systems and methods for reviewing, and possibly recovering, retired memory blocks in a memory device. In an example, the retired memory blocks are memory blocks that have failed programming operations or are otherwise identified as bad memory blocks.

However, a memory block may be misidentified or mischaracterized as a bad memory block. For example, a particular memory block may be misidentified as a bad memory block due to an issue or problem with a memory block that was programmed prior to the particular memory block being programmed. Thus, the particular memory block may actually function properly.

In order to address the above, the present application describes various processes in which a memory block that has been identified as a bad memory block may be reviewed and possibly recovered. In an example, the review and recovery process occurs based, at least in part, on certain criteria being met.

For example, a programming operation (e.g., a data write operation) may be executed on a first memory block. If that programming operation fails, the first memory block is identified as a bad memory block or a grown bad block (GBB). As a result, an identifier associated with the first memory block is stored as an entry in a failed memory block list. In addition, firmware or a controller associated with the memory device may also track or otherwise identify a second memory block that is related to and/or was programmed prior to the first memory block.

For example, the first memory block and the second memory block may share a common control gate line or word line. In another example, the first memory block and the second memory block may have or otherwise be associated with different control gate lines and/or word lines. In an example, the first memory block may store host data while the second memory block may store control data (e.g., mapping tables or other control information). In this example, the control information stored by the second memory block may be updated prior to the host data being written to the first memory block. In yet another example, a programming operation may store host data on the second memory block and subsequently store host data on the first memory block.

Regardless of the relationship between the first memory block and the second memory block, when a programming operation fails on the first memory block, an identifier associated with a second memory block is also stored as an entry in the failed memory block list. As indicated above, the second memory block is also identified as being related to or otherwise associated with the first memory block.

This process continues until a threshold number of entries are included in the failed memory block list. When the threshold number of entries has been reached, a memory block review and/or recovery process is initiated. During this process, the failed memory block list is analyzed to determine whether there is any correlation between any of the first memory blocks that are included in the failed memory block list and any of the second memory blocks that are included in the failed memory block list.

For example, the failed memory block list may include different identifiers associated with different "first memory blocks" (e.g., memory blocks that have failed various different programming operations) and may also include many different identifiers associated with different (or the same) "second memory blocks" (e.g., memory blocks that were programmed prior to the first memory blocks failing the various programming operations).

If there is a correlation between multiple first memory blocks and a single second memory block (e.g., multiple different first memory blocks are associated with the same second memory block), an independent program operation is performed on each first memory block in the failed memory block list that is associated with the same second memory block. The independent programming operation is executed to determine whether each of the first memory blocks are truly bad blocks or whether the second memory block is causing an issue with one or more of the first memory blocks. Thus, each of the first memory blocks may be identified as "victim" memory blocks while the second memory block may be identified as a "culprit" memory block.

If the independent program operation on the first memory block is successful, the first memory block is identified as a good memory block and is reclaimed or recovered. If a memory block is recovered, the second memory block may be identified as a bad memory block. Any data stored by the second memory block is transferred to another memory block and the second memory block is retired or otherwise identified as a bad block.

In accordance with the above, many technical benefits may be realized including, but not limited to, increased life and storage capacity of various memory devices, an ability to detect and address block-to-block disturbance, improved performance of the memory device by removing culprit memory blocks, and an ability to recover and use memory blocks that have been mislabeled or misidentified as bad memory blocks.

These benefits and other examples will be shown and described in greater detail with respect to FIG. 1-FIG. 8.

Figure 1:
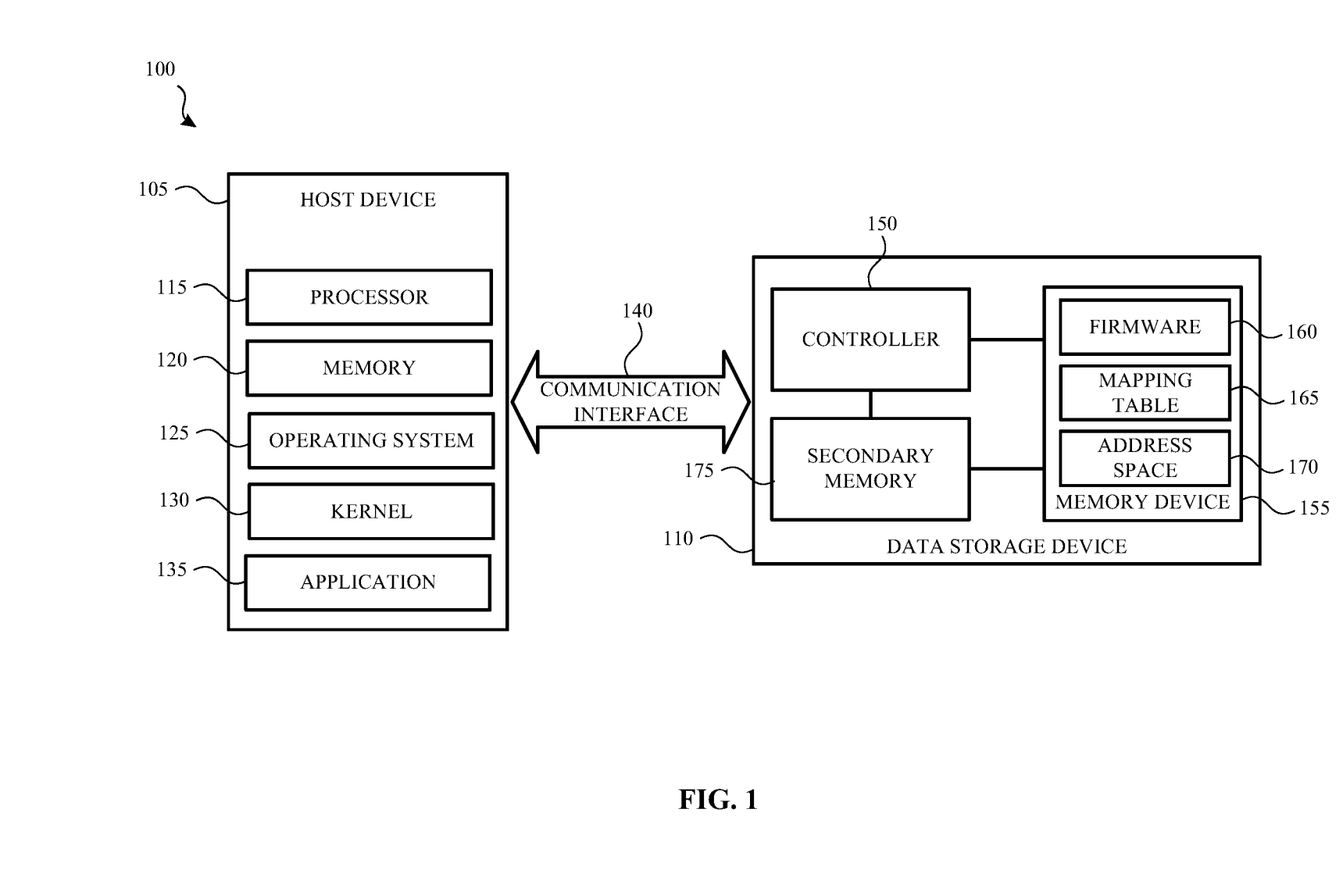
FIG. 1 is a block diagram of a system that may be used to execute the various processes described herein according to an example.

FIG. 1 is a block diagram of a system 100 that includes a host device 105 and a data storage device 110 according to an example. In an example, the host device 105 includes a processor 115 and a memory device 120 (e.g., main memory). The memory device 120 may include an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hard-wired logic, analog circuitry and/or various combinations thereof. In an example, the processor 115 may include a System on a Chip (SoC).

In an example, the memory device 120 can be used by the host device 105 to store data used by the processor 115. Data stored in the memory device 120 may include instructions provided by the data storage device 110 via a communication interface 140. The data stored in the memory device 120 may also include data used to execute instructions from the operating system 125 and/or one or more applications 135. In an example, the memory 120 is volatile memory, such as, for example, Dynamic Random Access Memory (DRAM).

In an example, the operating system 125 may create a virtual address space for the application 135 and/or other processes executed by the processor 115. The virtual address space may map to locations in the memory device 120. The operating system 125 may include or otherwise be associated with a kernel 130. The kernel 130 may include instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or WiFi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

The data storage device 110 includes a controller 150 and a memory device 155 (e.g. volatile and/or non-volatile memory). The memory device 155 (and/or portions of the memory device 155) may also be referred to as a storage medium. The memory device 155 includes a number of storage elements. In an example, each storage element is a chip or a memory die that is used to store data.

For example, the memory device 155 may include a first memory die and a second memory die. In an example, the first memory die and the second memory die include non-volatile memory elements such as, for example, NAND flash memory elements and/or NOR flash memory elements. Although two memory dies are mentioned, the memory device 155 may include any number of storage elements. For example, the storage elements may take the form of solid-state memory such as, for example, 2D NAND, 3D NAND memory, multi-level cell memory, triple level cell memory, quad-level cell memory, penta-level cell memory or any combination thereof.

The controller 150 may include circuitry for executing instructions. The instructions may originate from firmware 160 associated with the data storage device 110. In another example, the instructions may originate from the host device 105. Accordingly, the controller 150 may include circuitry such as one or more processors, a microcontroller, a DSP, an ASIC, an FPGA, hard-wired logic, analog circuitry and/or a combination thereof. In another example, the controller 150 may include a SoC.

The data storage device 110 may also include secondary memory 175. The secondary memory 175 may be a rotating magnetic disk or non-volatile solid-state memory, such as flash memory. While the description herein refers to solid-state memory generally, it is understood that solid-state memory may comprise one or more of various types of memory devices such as flash integrated circuits, NAND memory (e.g., single-level cell (SLC) memory, multi-level cell (MLC) memory (i.e., two or more levels), or any combination thereof), NOR memory, EEPROM, other discrete Non-Volatile Memory (NVM) chips, or any combination thereof.

In some examples, the memory device 155 is capable of storing data at a byte-addressable level, as opposed to other types of non-volatile memory that have a smallest writable data size such as a page size of 4 KB or a sector size of 512 Bytes.

In some examples, the memory device 155 may also store a mapping table 165 and/or an address space 170. In some examples, the controller 150 can associate portions of data stored in the secondary memory 175 with unique identifiers. The unique identifiers may be stored in the memory device 155 and be used by the operating system 125 to access stored data. For example, the mapping table 165 can provide a mapping of unique identifiers with indications of physical locations (e.g., Physical Block Addresses (PBAs)) where the corresponding portions of data are stored in the memory device 155 and/or the secondary memory 175.

In some examples, the firmware 160 may store, maintain, be associated with or otherwise have access to a mapping table (e.g., mapping table 165) that stores and/or maintains the updated programming order of memory dies for specific memory blocks.

As briefly discussed above, the memory device 155 may also include address space 170. The address space 170 can serve as at least a portion of an address space used by the processor 115. In an example, the address space 170 can store data at a byte-addressable level that can be accessed by the processor 115 (e.g., via the communication interface 140).

For example, the data storage device 110 may provide the host device 105 with an indication of the address space 170. The host device 105 may then associate an address range for the address space 170 and an indication that this address range is to be used as a byte-addressable address space, such as for a page cache.

In another example, the host device 105 may manage the data storage device 110 such that the processor 115 can directly access address space 170. For example, the data storage device 110 may provide logical to physical address translation information to the host device 105, which can be called by the host device 105 and executed by the processor 115 and/or the controller 150. In some examples, the controller 150 may include or otherwise be associated with a flash translation layer (FTL). The FTL may map the logical block addresses to the physical addresses of the memory device 155.

Although FIG. 1 illustrates the host device 105 being separate from the data storage device 110, the host device 105 and the data storage device 110, as well the various components described, may be part of a single device or part of multiple devices.

Figure 2A:
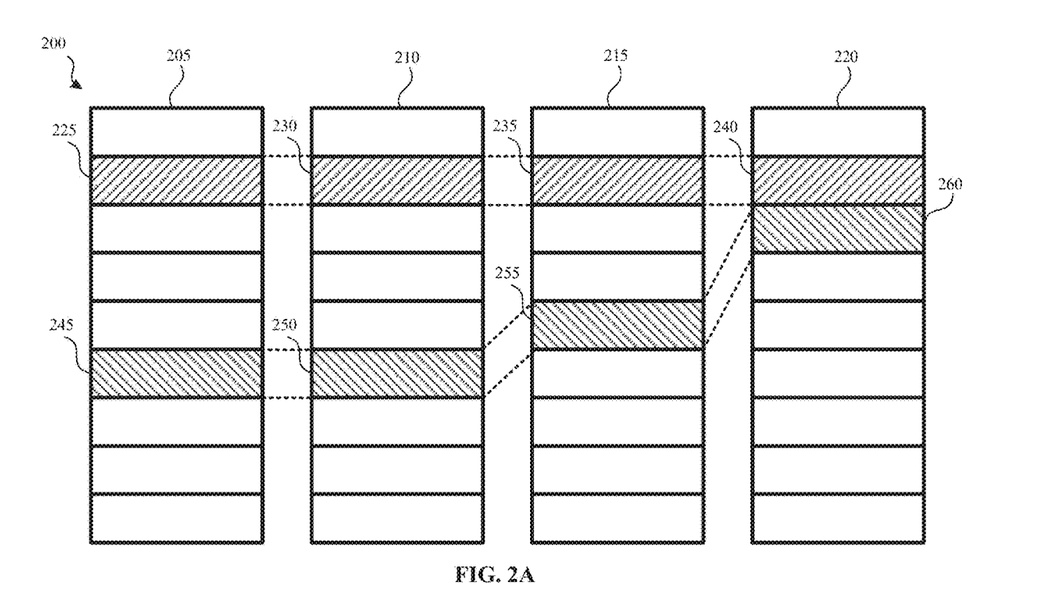
FIG. 2A illustrates how various memory blocks of a memory die may be organized into metablocks according to an example.

FIG. 2A illustrates organization of physical memory of a memory device 200. The memory device 200 may be similar to the memory device 155 shown and described with respect to FIG. 1.

In an example, the memory device 200 may be arranged in blocks of memory cells. A block of memory cells is the smallest number of memory cells that are physically erasable together. For increased parallelism, however, each of the blocks may be operated or organized in larger blocks or metablocks. For example, one block from each of at least two planes of memory cells may be logically linked together to form a metablock.

As shown in FIG. 2A, the memory device 200 may include four planes or sub-arrays (e.g., a first plane 205, a second plane 210, a third plane 215, and a fourth plane 220) integrated on a single memory die. In another example, the planes may be provided on two different memory dies (e.g., two planes on each memory die) or on four separate memory dies. Although four planes are shown and described, the memory device 200 may have any number of planes and/or memory dies.

In an example, the planes are individually divided into memory blocks consisting memory cells. As shown in FIG. 2A the rectangles represent each memory block, such as memory block 225, memory block 230, memory block 235 and memory block 240. There may be dozens or hundreds of memory blocks in each plane of the memory device 200.

Various memory blocks may be logically linked or grouped together (e.g., using a table in or otherwise accessible by the controller 150) to form a metablock that may be written to, read from and/or erased as a single unit. For example, memory block 225, memory block 230, memory block 235 and memory block 240 may form a first metablock while memory block 245, memory block 250, memory block 255 and memory block 260 may form a second metablock. The memory blocks used to form a metablock need not be restricted to the same relative locations within their respective planes.

Figure 2B:
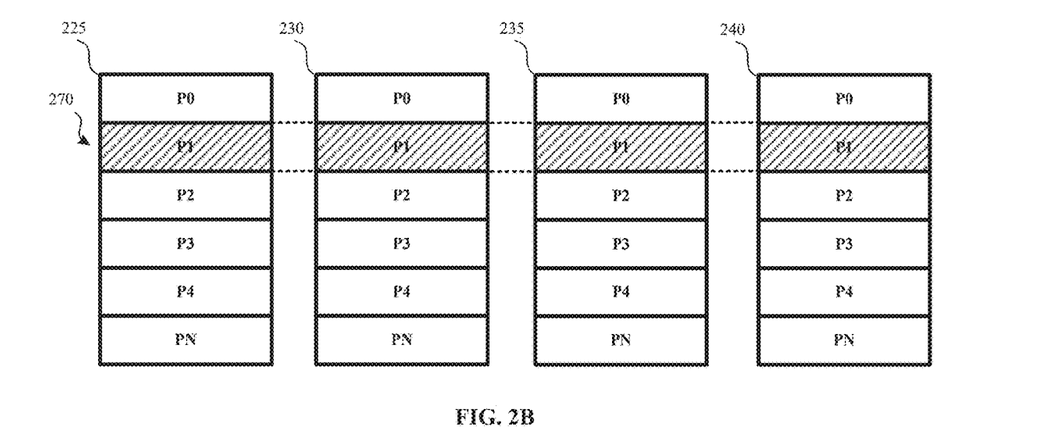
FIG. 2B illustrates how a metablock may include one or more metapages and how a metapage includes a page from various memory dies according to an example.

In an example, each memory block may be divided for operational purposes into pages of memory cells, such as illustrated in FIG. 2B. The memory cells of each of memory block 225, memory block 230, memory block 235 and memory block 240 for example, are each divided into N different pages (shown as P0-PN). In an example, there may be 16, 32, or more pages of memory cells within each memory block.

In an example, a page is a unit of data programming within the memory block. Each page includes the minimum amount of data that can be programmed at one time. The minimum unit of data that can be read at one time may be less than a page. A metapage 270 is illustrated in FIG. 2B as being formed of one physical page from each of memory block 225, memory block 230, memory block 235 and memory block 240. In the example, shown, the metapage 270 includes page P1 in each of the four memory blocks. However, the pages of the metapage 270 need not necessarily have the same relative position within each of the memory blocks. A metapage 270 may be the maximum unit of programming within a memory block.

The memory blocks disclosed in FIG. 2A-FIG. 2B are referred to herein as physical memory blocks because they relate to groups of physical memory cells as discussed above. As used herein, a logical memory block is a virtual unit of address space defined to have the same size as a physical memory block. Each logical memory block includes a range of logical memory block addresses (LBAs) that are associated with data received from a host. The LBAs are then mapped to one or more physical memory blocks in the data storage device 110 where the data is physically stored.

Figure 3A:
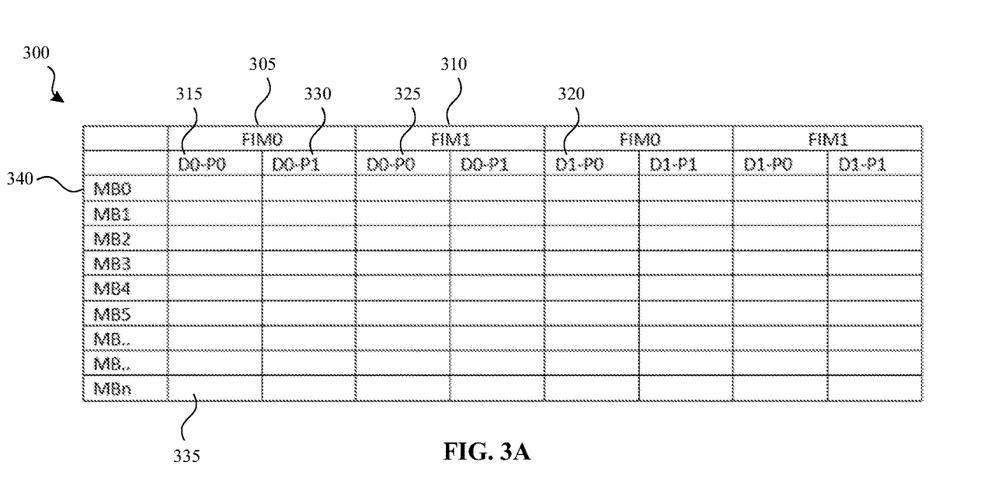
FIG. 3A illustrates an organization of a memory device according to another example.

FIG. 3A illustrates an organization of a memory device 300 according to another example. In an example, the memory device 300 may be similar to the memory device 155 shown and described with respect to FIG. 1 and/or the memory device 200 shown and described with respect to FIG. 2A.

In the example shown, the memory device 300 includes two flash interface modules (FIMs) labeled FIM0 305 and FIM 1 310. Each flash interface module provides an interface between a host device (e.g., host device 105 (FIG. 1)) and the memory device 300 and/or a data storage device (e.g., data storage device 110 (FIG. 1)).

The memory device 300 also includes two memory dies (e.g., D0 315 and D1 320) and each memory die has two planes (P0 325 and P1 330). Thus, the memory device 300 may be referred to as a two die-two plane system. Although two dies having two planes is specifically mentioned, the memory device 300 may have any number of dies and/or any number of planes.

Additionally, the memory device 300 includes a number of memory blocks 335. In the example shown in FIG. 3A, each rectangle in each vertical column represents a memory block 335. Further, in the example shown in FIG. 3A, a metablock (e.g., MB0 340) may be formed from one or more memory blocks 335 in each plane. In another example, a metablock may include memory blocks 335 across multiple planes and/or memory dies. For example, a metablock may include memory blocks 335 from D0 315 and D1 320 and from each plane (e.g., (P0 325 and P1 330) of each memory die.

Figure 3B:
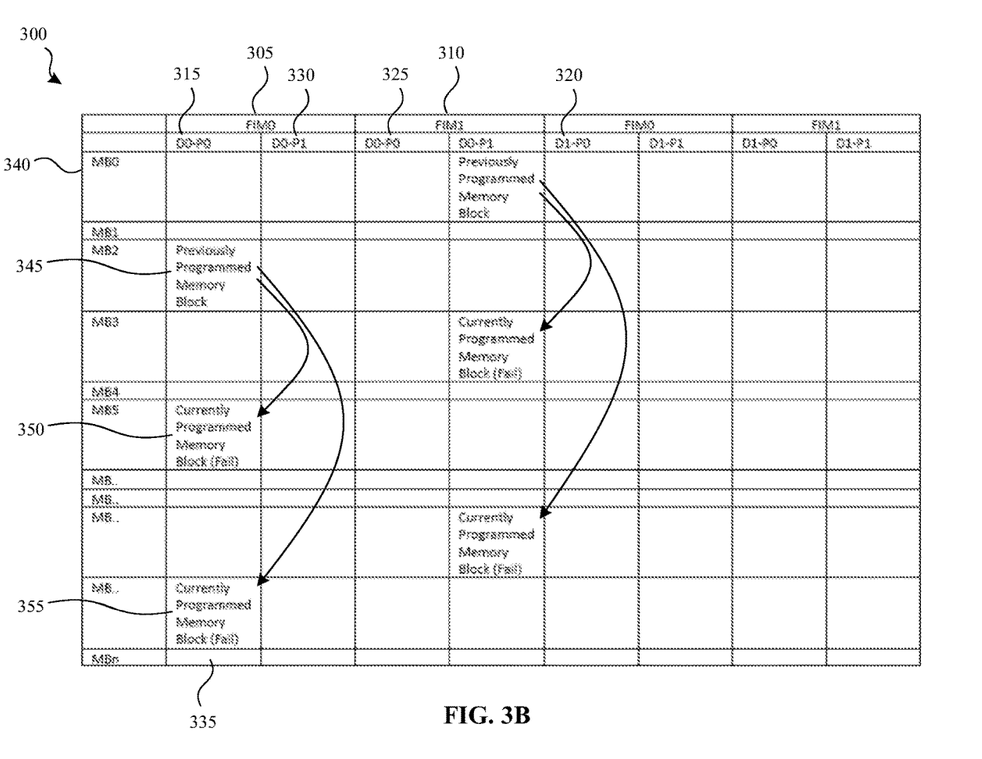
FIG. 3B illustrates how various memory blocks of the memory device shown and described with respect to FIG. 3A may be identified and added to a failed memory block list according to an example.

FIG. 3B illustrates how various memory blocks 335 of the memory device 300 shown and described with respect to FIG. 3A may be identified and added to a failed memory block list according to an example. In the example shown, and as will be described in greater detail with respect to FIG. 4-FIG. 6, the systems and methods described may be used to detect program failures due to inter-block (e.g., block-to-block) interference or program disturbance across blocks, including, but not limited to, program failures due to various memory blocks 335 sharing a common word line or control gate line.

In the example shown in FIG. 3B, host data from a host device (e.g., host device 105 (FIG. 1)) may be received by the memory device 300. Upon receipt of the host data, a program operation may be performed on a particular memory block. For purposes of explanation, this memory block is labeled as previously programmed memory block 345 and is located at FIM0-D0-P0 MB2. In an example, the program operation is a data write operation in which control data is written to the previously programmed memory block 345. Although control data is specifically mentioned, the program operation may cause any type of data to be written and/or stored by the previously programmed memory block 345.

Once the program operation on previously programmed memory block 345 is complete, another program operation may be performed on another memory block. In the example shown in FIG. 3B, this memory block is shown as currently programmed memory block 350. The currently programmed memory block 350 is located at FIM0-D0-P0 MB5. As indicated in FIG. 3B, the program operation on the currently programmed memory block 350 has failed.

Figure 4A:
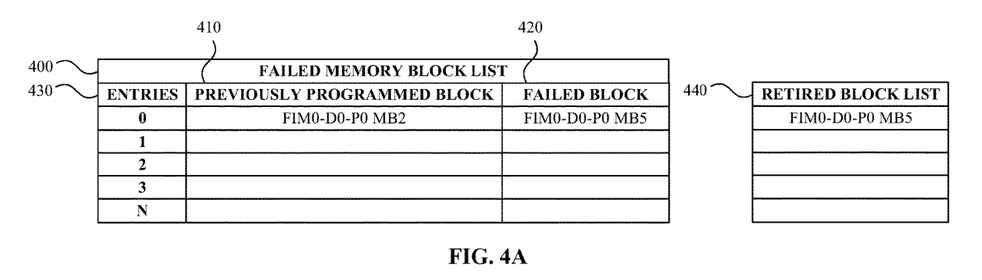
FIG. 4A illustrates a failed memory block list having a single entry and a retired block list having a single entry according to an example.

As a result and referring to FIG. 4A, an identifier (e.g., a physical address of the currently programmed memory block 350) is added as an entry 430 in a failed memory block list 400. For example, the identifier FIM0-D0-P0 MB5 is added as an entry in a failed block column 420 of the failed memory block list 400.

Referring back to FIG. 3B, a controller or firmware associated with the memory device 300 may track a program history of all the memory blocks 335 of the memory device 300. For example, the controller or firmware may track an order in which each memory block 335 in a particular plane and/or on a particular memory die is programmed. The order or program history of a particular memory block 335 may include an immediately previous programmed memory block (e.g., the previously programmed memory block 345) or any previously programmed memory block that is associated with the currently programmed memory block 350. The program history of each memory block may be stored in a three-dimensional array, a tree, a list or other data structure.

Referring back to FIG. 4A, because the previously programmed memory block 345 is identified as being programmed prior to the currently programmed memory block 350, and because the currently programmed memory block 350 failed the programming operation, an identifier (e.g., a physical address of the previously programmed memory block 345) is added to a previously programmed block column 410 of the failed memory block list 400. For example and as shown in FIG. 4A, the identifier (e.g., FIM0-D0-P0 MB2) associated with the previously programmed memory block 345 is added to the failed memory block list 400. Additionally, the identifier of the previously programmed memory block 345 is associated with the identifier (e.g., FIM0-D0-P0 MB5) of the currently programmed memory block 350.

In an example, because the currently programmed memory block 350 failed the programming operation, a garbage collection process may commence on the currently programmed memory block 350. The garbage collection process may cause any and/or all data stored on the currently programmed memory block 350 to be transferred to another memory block. In such an example, program/control information associated with the data may also need to be updated.

In addition, the currently programmed memory block 350 is marked as a bad block or grown bad block (GBB) and is retired. As such, the identifier (e.g., FIM0-D0-P0 MB5) associated with the currently programmed memory block 350 is added to a retired block list 440.

Referring back to FIG. 3B, additional host data may be received by the memory device 300. Upon receipt of the additional host data, a program operation may be performed by the previously programmed memory block 345 (e.g., the memory block located in FIM0-D0-P0 MB2). As with the example described above, the program operation is a data write operation in which control data is written to the previously programmed memory block 345. Although control data is specifically mentioned, the program operation may cause any type of data to be stored by the previously programmed memory block 345.

Once the program operation on the previously programmed memory block 345 is complete, another program operation may be performed on another memory block that is associated with the previously programmed memory block 345. In this iteration, the program operation is performed on the currently programmed memory block 355 located in FIM0-D0-P0 MBN-1. As shown in FIG. 3B, the program operation on the currently programmed memory block 355 has also failed.

Figure 4B:
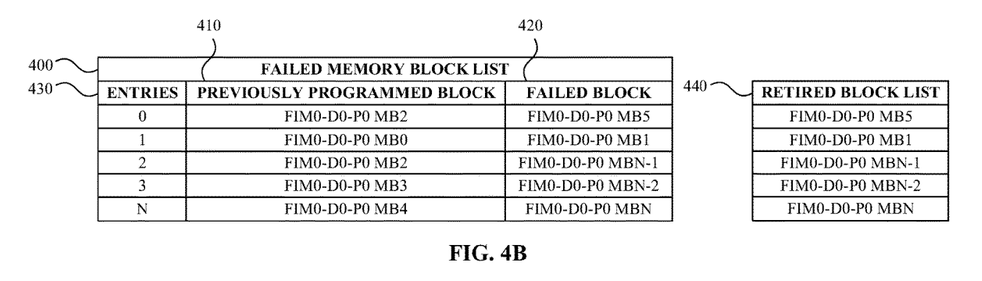
FIG. 4B illustrates the failed memory block list and the retired block list of FIG. 4A having multiple entries according to an example.

As a result, and referring to FIG. 4B, an identifier (e.g., a physical address of the currently programmed memory block 355) is added as an entry 430 in the failed memory block list 400. For example, the identifier FIM0-D0-P0 MBN-1 is added as entry "2" in the failed block column 420 of the failed memory block list 400. Likewise, an identifier of the previously programmed memory block 345 is added to the previously programmed block column 410 of the failed memory block list 400. The identifier for the previously programmed memory block 345 is associated with the identifier of the currently programmed memory block 355.

For example and as shown in FIG. 4B, the identifier (e.g., FIM0-D0-P0 MB2) of the previously programmed memory block 345 is associated with the identifier (e.g., FIM0-D0-P0 MBN-1) of the currently programmed memory block 355. A garbage collection process may also commence on the currently programmed memory block 355 such as previously described. Additionally, the currently programmed memory block 355 is marked as a bad block or grown bad block (GBB) and is retired. As such, the identifier (e.g., FIM0-D0-P0 MBN-1) associated with the currently programmed memory block 355 is added to the retired block list 440.

As shown in FIG. 4B, the failed memory block list 400 may include a number of different entries 430. For example, the failed memory block list 400 may include previously programmed memory blocks and associated currently programmed memory blocks at: FIM0-D0-P0 MB0 and FIM0-D0-P0 MB1; at FIM0-D0-P0 MB3 and FIM0-D0-P0 MBN-2; and at FIM0-D0-P0 MB4 and FIM0-D0-P0 MBN.

When a threshold (e.g., N) number of entries 430 is included in the failed memory block list 400, a memory block recovery process may be initiated or otherwise commence. In an example, the memory block recovery process may be initiated by a controller or firmware associated with the memory device 300.

As part of the memory block recovery process, the failed memory block list 400 is analyzed to determine whether a particular previously programmed memory block (or an identifier associated with the particular previously programmed memory block) is included multiple times and associated with a number of different failed blocks.

For example, in FIG. 4B, the identifier FIM0-D0-P0 MB2 associated with the previously programmed memory block 345 is included in the previously programmed block column 410 multiple times (e.g., at entry 0 and at entry 2). Additionally, the identifier FIM0-D0-P0 MB2 is included or otherwise associated with two different failed blocks (e.g., FIM0-D0-P0 MB5 and FIM0-D0-P0 MBN-1).

Because the previously programmed memory block 345 is included in the previously programmed block column 410 multiple times, the ultimate issue may originate with the previously programmed memory block 345, and not the currently programmed memory block 350 and/or the currently programmed memory block 355. For example, an issue with the previously programmed memory block 345 may be causing the currently programmed memory block 350 and/or the currently programmed memory block 355 to fail subsequent programming operations. As such, the previously programmed memory block 345 may be identified or otherwise be referred to herein as a "culprit block" and each of the currently programmed memory block 350 and the currently programmed memory block 355 may be identified herein or otherwise be referred to as a "victim block".

In order to determine whether one or more the currently programmed memory block 350 and/or the currently programmed memory block 355 are actually victim blocks, an independent programming operation is performed on each memory block. If in the independent programming operation on a particular memory block is successful, that memory block is removed from the retired block list 440 and is ultimately recovered.

Additionally, the previously programmed memory block 345 is identified as a bad block. A garbage collection process is performed on the previously programmed memory block 345 and an identifier associated with the previously programmed memory block 345 is added to the retired block list 440.

However, if the independent programming operation is not successful on the particular memory block, that particular memory block remains identified as a bad memory block. This process repeats for each memory block associated with the previously programmed memory block 345 in the failed memory block list 400.

Figure 4C:
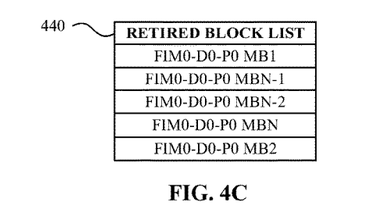
FIG. 4C illustrates the retired block list of FIG. 4B after it has been updated based on a memory block recovery process according to an example.

In an example shown and described with respect to FIG. 4B-FIG. 4C, the independent programming operation was successful on currently programmed memory block 350, but not on currently programmed memory block 355. As a result and as shown in FIG. 4C, the identifier (e.g., FIM0-D0-P0 MB5) associated with the currently programmed memory block 350 has been removed from the retired block list 440. However, the identifier (e.g., FIM0-D0-P0 MBN-1) associated with the currently programmed memory block 355 remains on the retired block list 440 because it failed the independent programming operation.

In addition, the identifier (e.g., FIM0-D0-P0 MB2) associated with the previously programmed memory block 345 has been added to the retired block list 440. The identifier associated with the previously programmed memory block 345 has been added because it may have caused the currently programmed memory block 350 to fail the initial programming operation.

For example, the programming failure may have been caused because the currently programmed memory block 350 and the previously programmed memory block 345 share a common control gate line or word line. In another example, inter-block interference or program disturb across/between the currently programmed memory block 350 and the previously programmed memory block 345 may be the cause/reason the currently programmed memory block 350 failed its initial programming operation.

In another example, both the currently programmed memory block 350 and the currently programmed memory block 355 may fail the independent programming operation. In such an example, identifiers for each of the currently programmed memory block 350 and the currently programmed memory block 355 may remain on the retired block list 440 and the previously programmed memory block 345 will not be identified as a bad block.

In an example, a memory block that is identified as a culprit block is retired and added to the retired block list 440 when an independent programming operation is successful on any associated victim block-regardless of how many victim blocks ultimately fail the independent programming operation.

The operations described above may occur any number of times across all of the planes of each die of the memory device 300. For example, the same or similar processes may occur simultaneously or substantially simultaneously on a different FIM, die or plane. FIG. 3B shows a previously programmed block and associated currently programmed blocks are identified at FIM1-D0-P1 MB0; FIM1-D0-P1 MB3; and FIM1-D0-P1 MBN-2.

Figure 5:
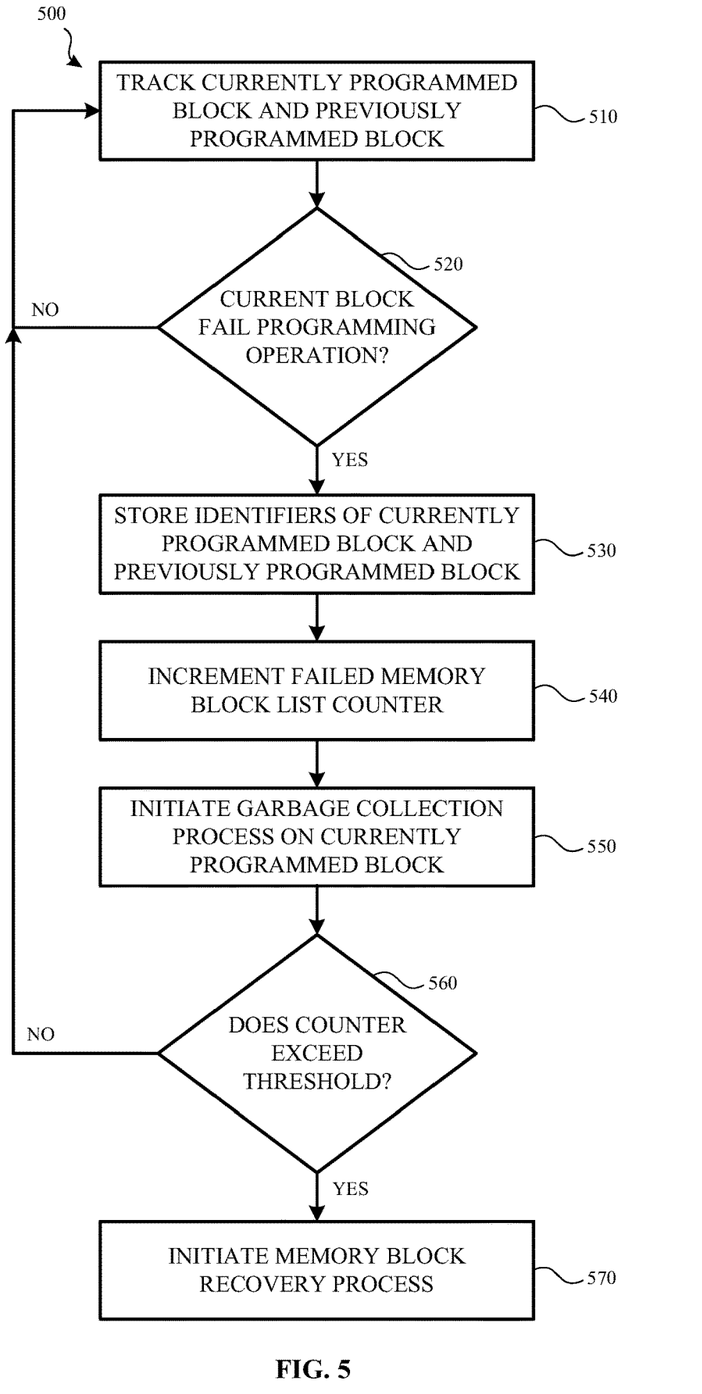
FIG. 5 illustrates a method for identifying potential culprit blocks and potential victim blocks according to an example.

FIG. 5 illustrates a method 500 for identifying potential culprit blocks and potential victim blocks according to an example. The method 500 may be performed by a controller (e.g., controller 150 (FIG. 1)) or firmware (e.g., firmware 160 (FIG. 1)) associated with a data storage device (e.g., data storage device 110 (FIG. 1)), a memory device (e.g., memory device 155 (FIG. 1)) and/or a host device (e.g., host device 105 (FIG. 1)). In an example, the method 500 may be performed on each plane of a memory die associated with a memory device.

Method 500 begins when a memory device receives data. In an example, the data may be received from a host device. In another example, that data may be received as part of an internal data write operation. The internal data write operation may be part of or otherwise associated with a garbage collection process or other internal data movement process whereby data is moved/transferred from one location to another location. In response to receiving the data. the controller or firmware associated with the memory device initiates a programming operation on various memory blocks. Additionally, the firmware or the controller tracks (510) where the received data is being written/programmed.

For example, the controller or firmware may track or otherwise identify a currently written/programmed block (or a first memory block) and a previously written/programmed block (or second memory block). In an example, tracking the currently programmed block and the previously programmed block includes storing an identifier or physical block address associated with each of the currently programmed block and the previously programmed block in a list, an array, a tree, or other memory structure.

The controller or firmware may then determine (520) whether the programming operation on the currently programmed block failed. If it is determined that the programming operation did not fail (e.g., the programming operation was successful), the controller or firmware continues to monitor or track (510) subsequent programming operations on the various memory blocks.

However, if it is determined that the programming operation failed on the currently programmed block, the controller or firmware causes identifiers of the currently programmed block and the previously programmed block to be stored. In an example, identifiers associated with the currently programmed block and the previously programmed block may be stored in a failed memory block list such as, for example, the failed memory block list 400 shown and described with respect to FIG. 4A.

When the identifiers associated with the currently programmed block and the previously programmed block have been stored in the failed memory block list, a failed memory block counter is incremented (540). In addition, a garbage collection process is initiated (550) on the currently programmed block and the currently programmed block is identified as a bad block or is otherwise retired.

In an example, the garbage collection process causes any data stored by the currently programmed block to be relocated to another memory block. Additionally, an identifier associated with the currently programmed block may be added to a retired block list such as, for example, the retired block list 440 shown and described with respect to FIG. 4A.

The controller or firmware may then determine (560) whether the failed memory block list counter exceeds a threshold. In an example, the threshold may be predetermined and/or static. In another example, the threshold may be dynamic and change over the lifetime of the memory device. For example, the threshold may be relatively high (e.g., forty entries) during a first time period (e.g. at or near the beginning of life of the memory device) and relatively low (e.g., twenty entries) at a second time period (e.g., at or near the end of life of the memory device) or vice versa.

If it is determined that the failed memory block list counter does not exceed the threshold, the controller or firmware continues to track (510) the currently programmed and previously programmed blocks as previously described. However, if it is determined that the failed memory block list count exceeds the threshold, a memory block recovery process is initiated (570). The memory block recovery process will be described in greater detail below with respect to FIG. 6.

Figure 6:
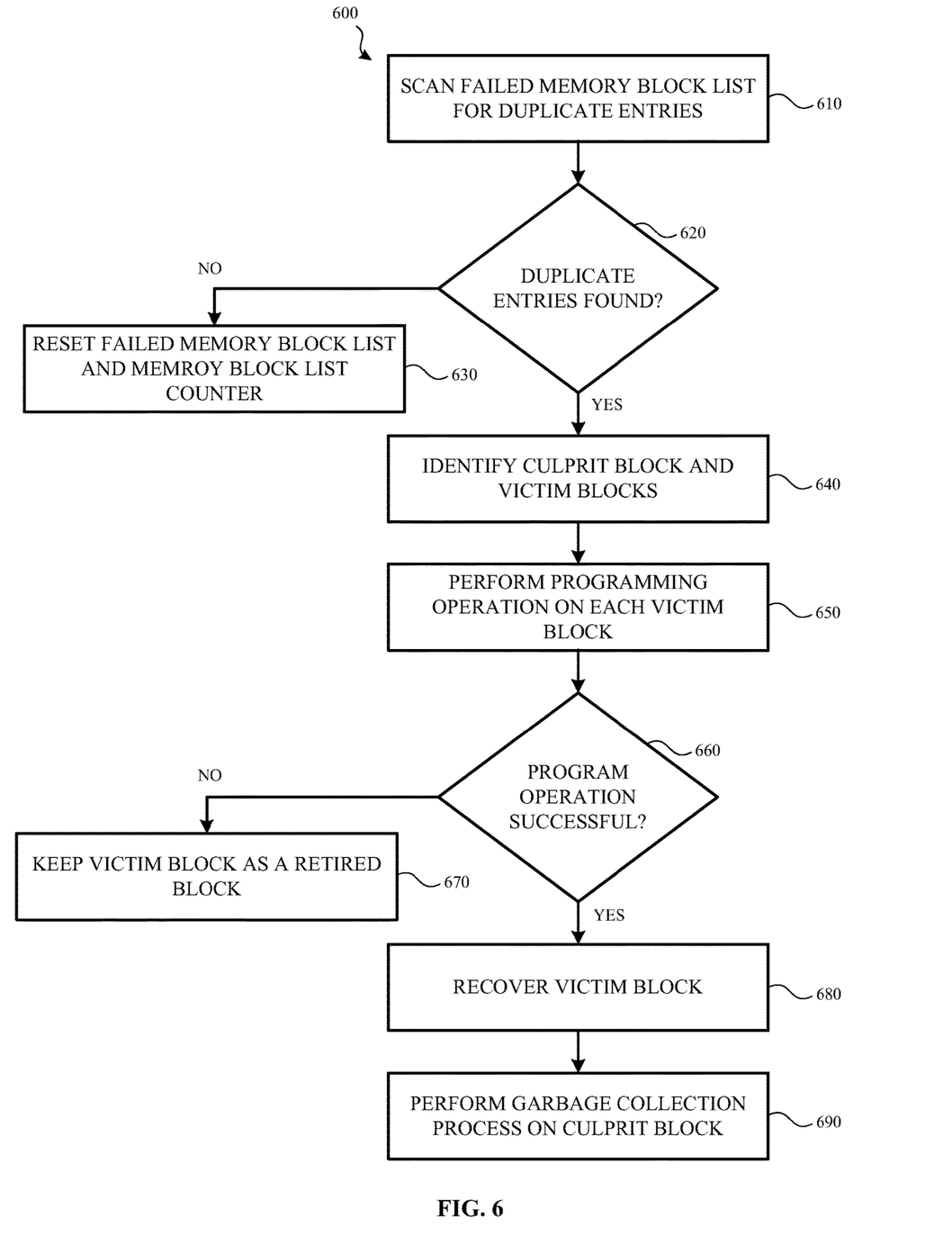
FIG. 6 illustrates a method of recovering a memory block that has been identified as a victim block according to an example.

FIG. 6 illustrates a method 600 of recovering a memory block according to an example. The method 600 may be performed by a controller (e.g., controller 150 (FIG. 1)) or firmware (e.g., firmware 160 (FIG. 1)) associated with a data storage device (e.g., data storage device 110 (FIG. 1)), a memory device (e.g., memory device 155 (FIG. 1)) and/or a host device (e.g., host device 105 (FIG. 1)). In an example, the method 600 may be performed in response to a memory block recovery process being initiated such as previously described with respect to FIG. 5.

Method 600 begins when a failed memory block list (e.g., failed memory block list 400 (FIG. 4B)) is scanned (610) for duplicate entries. For example, the memory block list is scanned to determine whether a previously programmed block column (e.g., previously programmed block column 410 (FIG. 4B)) of the failed memory block list includes the same identifier or entry associated with a particular previously programmed memory block.

If duplicate entries are not found, the failed memory block list and/or the associated memory block list counter may be reset (630). In another example, the memory block list counter may be reset while the entries in the failed memory block list remain intact. As such, the failed memory block list may be scanned multiple times before it is reset and/or before older entries are overwritten with newer entries. In some examples, if older entries in the failed memory block list are scanned multiple times, additional culprit and/or victim memory blocks may be identified. In an example, once the failed memory block list and/or the associated memory block list counter is reset, the method 600 may end and the method 500 shown and described with respect to FIG. 5 may commence.

However, if it is determined (620) that duplicate entries are found in the previously programmed block column of the failed memory block list, culprit blocks and associated victim blocks are identified. Additionally, a programming operation is performed (650) on each victim block that is associated with the same culprit block (e.g., culprit blocks that include multiple/duplicate entries in the failed memory block list).

In an example, the programming operation is an internal programming operation. The internal programming operation may be one in which a pre-configured input data pattern is programmed on each victim block.

A determination (660) is then made as to whether the programming operation on a particular victim block was successful. For example, when the programming operation described above is complete, the data may be read back and compared with the pre-configured data. If the programming operation on the particular victim block was not successful, the particular victim block remains (670) identified as a retired/bad block.

However, if the programming operation on the particular victim block was successful, the particular victim block is recovered (680). In an example, as part of the recovery process, an identifier associated with the particular victim block is removed from a retired block list (e.g., retired block list 440 (FIG. 4B)).

Additionally, a garbage collection process is initiated or otherwise performed (690) on the culprit block. As part of the garbage collection process, any data stored by the culprit block may be relocated to another memory block. As part of the garbage collection process (or before/after the garbage collection process), an identifier associated with the culprit block may be added to the retired block list or otherwise be identified as a bad block. The culprit block may then be retired.

In an example, operation 650 to operation 690 may be performed for each victim block that is identified or is otherwise associated with a culprit block.

Figure 7:
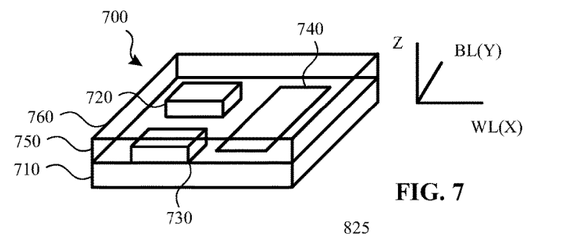
FIG. 7 is a perspective view of a storage device that includes three-dimensional (3D) stacked non-volatile memory according to an example.
Figure 8:
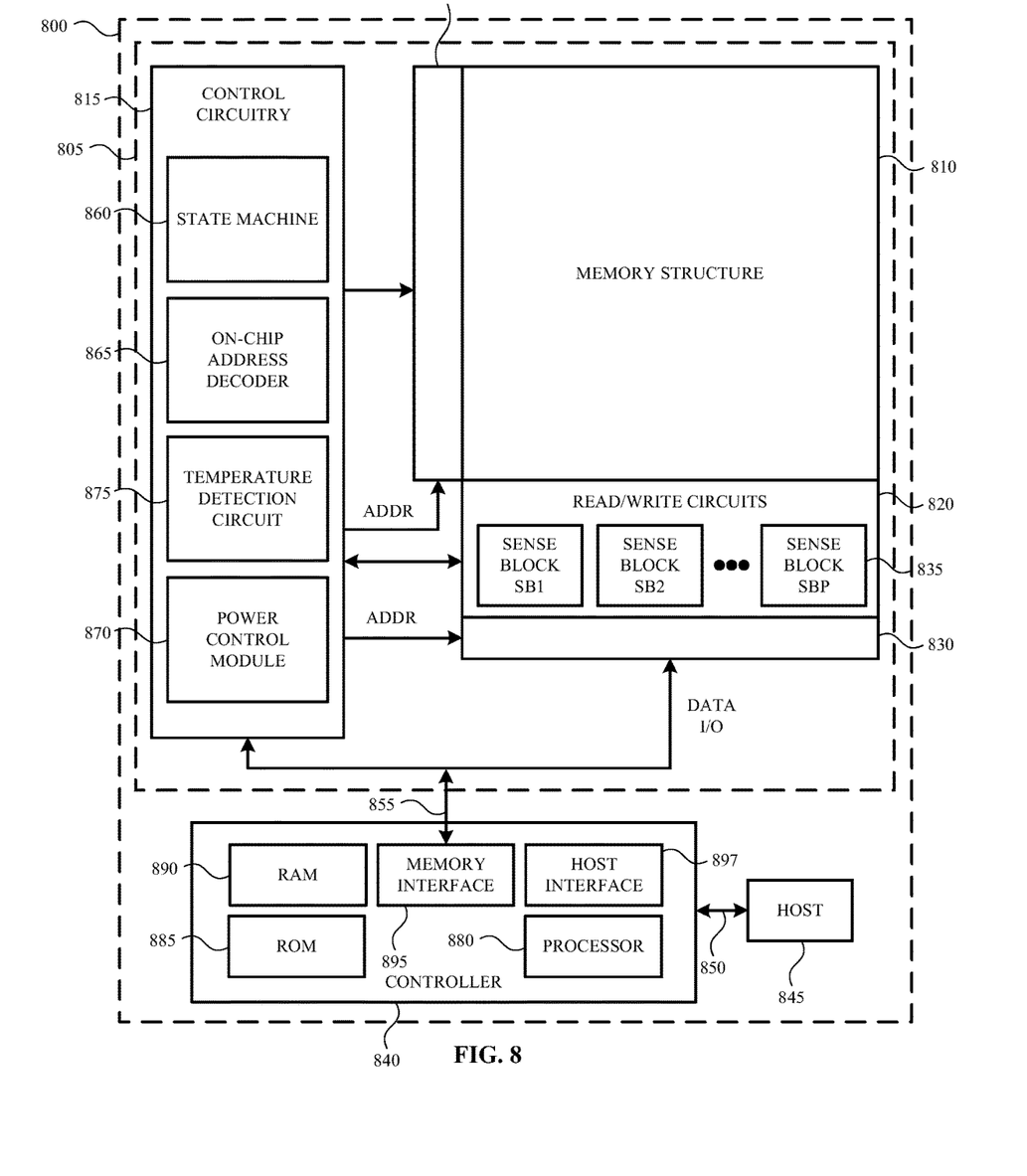
FIG. 8 is a block diagram of a storage device according to an example.

FIG. 7-FIG. 8 describe example storage devices that may be used with or otherwise implement the various features described herein. For example, the storage devices shown and described with respect to FIG. 7-FIG. 8 may include various systems and components that are similar to the systems and components shown and described with respect to FIG. 1. For example, the controller 840 shown and described with respect to FIG. 8 may be similar to the controller 150 of FIG. 1. Likewise, the memory dies 805 may be part of the memory device 155 of FIG. 1.

FIG. 7 is a perspective view of a storage device 700 that includes three-dimensional (3D) stacked non-volatile memory according to an example. In this example, the storage device 700 includes a substrate 710. Blocks of memory cells are included on or above the substrate 710. The blocks may include a first block (BLK0 720) and a second block (BLK1 730). Each block may be formed of memory cells (e.g., non-volatile memory elements). The substrate 710 may also include a peripheral area 740 having support circuits that are used by the first block and the second block.

The substrate 710 may also carry circuits under the blocks, along with one or more lower metal layers which are patterned in conductive paths to carry signals from the circuits. The blocks may be formed in an intermediate region 750 of the storage device 700. The storage device may also include an upper region 760. The upper region 760 may include one or more upper metal layers that are patterned in conductive paths to carry signals from the circuits. Each block of memory cells may include a stacked area of memory cells. In an example, alternating levels of the stack represent word lines. While two blocks are depicted, additional blocks may be used and extend in the x-direction and/or the y-direction.

In an example, a length of a plane of the substrate 710 in the x-direction represents a direction in which signal paths for word lines or control gate lines extend (e.g., a word line or drain-end select gate (SGD) line direction) and the width of the plane of the substrate 710 in the y-direction represents a direction in which signal paths for bit lines extend (e.g., a bit line direction). The z-direction represents a height of the storage device 700.

FIG. 8 is a functional block diagram of a storage device 800 according to an example. In an example, the storage device 800 may be the 3D stacked non-volatile storage device 700 shown and described with respect to FIG. 7. The components depicted in FIG. 8 may be electrical circuits. In an example, the storage device 800 includes one or more memory dies 805. Each memory die 805 includes a three-dimensional memory structure 810 of memory cells (e.g., a 3D array of memory cells), control circuitry 815, and read/write circuits 820. In another example, a two-dimensional array of memory cells may be used. The memory structure 810 is addressable by word lines using a first decoder 825 (e.g., a row decoder) and by bit lines using a second decoder 830 (e.g., a column decoder). The read/write circuits 820 may also include multiple sense blocks 835 including SB1, SB2, . . . , SBp (e.g., sensing circuitry) which allow pages of the memory cells to be read or programmed in parallel. The sense blocks 835 may include bit line drivers.

In an example, a controller 840 is included in the same storage device 800 as the one or more memory dies 805. In another example, the controller 840 is formed on a die that is bonded to a memory die 805, in which case each memory die 805 may have its own controller 840. In yet another example, a controller die controls all of the memory dies 805.

Commands and data may be transferred between a host 845 and the controller 840 using a data bus 850. Commands and data may also be transferred between the controller 840 and one or more of the memory dies 805 by way of lines 855. In one example, the memory die 805 includes a set of input and/or output (I/O) pins that connect to lines 855.

The memory structure 810 may also include one or more arrays of memory cells. The memory cells may be arranged in a three-dimensional array or a two-dimensional array. The memory structure 810 may include any type of non-volatile memory that is formed on one or more physical levels of arrays of memory cells having an active area disposed above a silicon substrate. The memory structure 810 may be in a non-volatile memory device having circuitry associated with the operation of the memory cells, whether the associated circuitry is above or within the substrate.

The control circuitry 815 works in conjunction with the read/write circuits 820 to perform memory operations (e.g., erase, program, read, and others) on the memory structure 810. The control circuitry 815 may include registers, ROM fuses, and other devices for storing default values such as base voltages and other parameters.

The control circuitry 815 may also include a state machine 860, an on-chip address decoder 865, a power control module 870 and a temperature detection circuit 875. The state machine 860 may provide chip-level control of various memory operations. The state machine 860 may be programmable by software. In another example, the state machine 860 does not use software and is completely implemented in hardware (e.g., electrical circuits).

The on-chip address decoder 865 may provide an address interface between addresses used by host 845 and/or the controller 840 to a hardware address used by the first decoder 825 and the second decoder 830.

The power control module 870 may control power and voltages that are supplied to the word lines and bit lines during memory operations. The power control module 870 may include drivers for word line layers in a 3D configuration, select transistors (e.g., SGS and SGD transistors) and source lines. The power control module 870 may include one or more charge pumps for creating voltages.

The control circuitry 815 may also include a temperature detection circuit 875. The temperature detection circuit may be configured to detect a temperature of one or more components of the memory device 800.

The control circuitry 815, the state machine 860, the on-chip address decoder 865, the first decoder 825, the second decoder 830, the temperature detection circuit 875, the power control module 870, the sense blocks 835, the read/write circuits 820, and/or the controller 840 may be considered one or more control circuits and/or a managing circuit that perform some or all of the operations described herein.

In an example, the controller 840, is an electrical circuit that may be on-chip or off-chip. Additionally, the controller 840 may include one or more processors 880, ROM 885, RAM 890, memory interface 895, and host interface 897, all of which may be interconnected. In an example, the one or more processors 880 is one example of a control circuit. Other examples can use state machines or other custom circuits designed to perform one or more functions. Devices such as ROM 885 and RAM 890 may include code such as a set of instructions. One or more of the processors 880 may be operable to execute the set of instructions to provide some or all of the functionality described herein.

Alternatively or additionally, one or more of the processors 880 may access code from a memory device in the memory structure 810, such as a reserved area of memory cells connected to one or more word lines. The memory interface 895, in communication with ROM 885, RAM 890, and one or more of the processors 880, may be an electrical circuit that provides an electrical interface between the controller 840 and the memory die 805. For example, the memory interface 895 may change the format or timing of signals, provide a buffer, isolate from surges, latch I/O, and so forth.

The one or more processors 880 may issue commands to control circuitry 815, or any other component of memory die 805, using the memory interface 895. The host interface 897, in communication with the ROM 885, the RAM 895, and the one or more processors 880, may be an electrical circuit that provides an electrical interface between the controller 840 and the host 845. For example, the host interface 897 may change the format or timing of signals, provide a buffer, isolate from surges, latch I/O, and so on. Commands and data from the host 845 are received by the controller 840 by way of the host interface 897. Data sent to the host 845 may be transmitted using the data bus 850.

Multiple memory elements in the memory structure 810 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

The memory cells may be arranged in the single memory device level in an ordered array, such as in a plurality of rows and/or columns. However, the memory elements may be arrayed in non-regular or non-orthogonal configurations, or in structures not considered arrays.

Some three-dimensional memory arrays are arranged so that memory cells occupy multiple planes or multiple memory device levels, thereby forming a structure in three dimensions (e.g., in the x, y, and z directions, where the z direction is substantially perpendicular and the x and y directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

By way of non-limiting example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

One of ordinary skill in the art will recognize that the technology described herein is not limited to a single specific memory structure, but covers many relevant memory structures within the spirit and scope of the technology as described herein and as understood by one of ordinary skill in the art.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device (e.g., host device 105 (FIG. 1)). Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Based on the above, examples of the present disclosure describe a method, comprising: identifying a currently programmed memory block in a memory device and a previously programmed memory block in the memory device, the previously programmed memory block being associated with the currently programmed memory block; based on detecting a program failure on the currently programmed memory block: storing a first memory block identifier associated with the currently programmed memory block and a second memory block identifier associated with the previously programmed memory block as an entry in a failed memory block list; and identifying the currently programmed memory block as a failed memory block; and based on determining that a number of entries in the failed memory block list exceed a threshold: determining whether the second memory block identifier associated with the previously programmed memory block is included in the failed memory block list multiple times; and based on determining the second memory block identifier associated with the previously programmed memory block is included in the failed memory block list multiple times, initiating a memory block recovery process on the currently programmed memory block. In an example, identifying the currently programmed memory block as a failed memory block comprises: performing a garbage collection process on the currently programmed memory block; and retiring the currently programmed memory block. In an example, initiating the memory block recovery process on the currently programmed memory block comprises: performing an independent program operation on the currently programmed memory block; determining whether the independent program operation on the currently programmed memory block is successful; and based on determining the independent program operation on the currently programmed memory block is successful, identifying the currently programmed memory block as a valid memory block. In an example, the method also includes resetting the entries in the failed memory block list. In an example, the method also includes determining whether the memory block recovery process is successful; and based on determining the memory block recovery process is successful, identifying the previously programmed memory block as a failed memory block. In an example, the method also includes relocating data stored by the previously programmed memory block to another memory block. In an example, the first memory block identifier is a physical address associated with the currently programmed memory block and wherein the second memory block identifier is a physical address associated with the previously programmed memory block. In an example, the previously programmed memory block stores control information and wherein the currently programmed memory block stores received data. In an example, the currently programmed memory block and the previously programmed memory block are associated with one of: a plane of a memory die of the memory device, and a metablock that spans multiple memory dies of the memory device. In an example, the method also includes resetting a counter associated with the failed memory block list, the counter indicating the number of entries in the failed memory block list.

In another example, a data storage device is described. In an example, the data storage device comprises: one or more memory dies; and a controller communicatively coupled to the one or more memory dies and operable to: identify a first memory block of the one or more memory dies and a second memory block of the one or more memory dies, the first memory block and the second memory block being associated with each other based, at least in part, on a programming operation; detect a failure of the programming operation on the first memory block; based on detecting the failure: store a first identifier associated with the first memory block and a second identifier associated with the second memory block as an entry in a list of failed memory blocks; and identify the first memory block as a failed memory block; and based on a determination that a number of entries in the list of failed memory blocks exceed a threshold: determine whether the second identifier associated with the second memory block is included in the list of failed memory blocks multiple times; and based on a determination that the second memory block identifier associated with the previously programmed memory block is included in the list of failed memory blocks multiple times, initiate a memory block recovery process on the first memory block. In an example, identifying the first memory block as a failed memory block comprises: performing a garbage collection process on the first memory block; and retiring the first memory block. In an example, initiating the memory block recovery process on the first memory block comprises: performing a program operation on the first memory block; determining whether the program operation is successful; and based on a determination that the independent program operation on the first memory block is successful, identifying the first memory block as a valid memory block. In an example, the controller is further operable to reset one or more of: the entries in the list of failed memory blocks, and a counter that indicates the number of entries in the list of failed memory blocks.

In an example, the controller is further operable to: determine whether the memory block recovery process is successful; and based on a determination that the memory block recovery process is successful, identify the second memory block as a failed memory block. In an example, the controller is operable to cause data stored by the second memory block to be relocated to another memory block. In an example, the second memory block stores control information and wherein the first memory block stores received data. In an example, the first memory block and the second memory block are associated with one of: a plane of the one or more memory dies, and a metablock that spans multiple memory dies.

In another example, a non-volatile storage device is described. In an example, the non-volatile storage device comprises: one or more memory dies; and means for initiating a memory recovery process on a first memory means associated with the one or more memory dies and a second memory means associated with the one or more memory dies based, at least in part, on a determination that each of the first memory means and the second memory means failed a programming operation after being associated with a third memory means. In an example, the means for initiating the memory recovery process further includes: means for performing a first program operation on the first memory means and a second program operation on the second memory means; means for determining whether at least one of the first program operation and the second program operation is successful; and means for identifying at least one of the first memory means and the second memory means as a valid memory means based, at least in part, that at least one of the first program operation and the second program operation was successful.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks. Additionally, it is contemplated that the flowcharts and/or aspects of the flowcharts may be combined and/or performed in any order.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
   identifying a currently programmed memory block in a memory device and a previously programmed memory block in the memory device, the previously programmed memory block being associated with the currently programmed memory block;
   based on detecting a program failure on the currently programmed memory block:
      storing a first memory block identifier associated with the currently programmed memory block and a second memory block identifier associated with the previously programmed memory block as an entry in a failed memory block list; and
      identifying the currently programmed memory block as a failed memory block; and
   based on determining that a number of entries in the failed memory block list exceed a threshold:
      determining whether the second memory block identifier associated with the previously programmed memory block is included in the failed memory block list multiple times; and
      based on determining the second memory block identifier associated with the previously programmed memory block is included in the failed memory block list multiple times, initiating a memory block recovery process on the currently programmed memory block.

2. The method of claim 1, wherein identifying the currently programmed memory block as a failed memory block comprises:
   performing a garbage collection process on the currently programmed memory block; and
   retiring the currently programmed memory block.

3. The method of claim 1, wherein initiating the memory block recovery process on the currently programmed memory block comprises:
   performing an independent program operation on the currently programmed memory block;
   determining whether the independent program operation on the currently programmed memory block is successful; and
   based on determining the independent program operation on the currently programmed memory block is successful, identifying the currently programmed memory block as a valid memory block.

4. The method of claim 1, further comprising resetting the entries in the failed memory block list.

5. The method of claim 1, further comprising:
   determining whether the memory block recovery process is successful; and
   based on determining the memory block recovery process is successful, identifying the previously programmed memory block as a failed memory block.

6. The method of claim 5, further comprising relocating data stored by the previously programmed memory block to another memory block.

7. The method of claim 1, wherein the first memory block identifier is a physical address associated with the currently programmed memory block and wherein the second memory block identifier is a physical address associated with the previously programmed memory block.

8. The method of claim 1, wherein the previously programmed memory block stores control information and wherein the currently programmed memory block stores received data.

9. The method of claim 1, wherein the currently programmed memory block and the previously programmed memory block are associated with one of: a plane of a memory die of the memory device, and a metablock that spans multiple memory dies of the memory device.

10. The method of claim 1, further comprising resetting a counter associated with the failed memory block list, the counter indicating the number of entries in the failed memory block list.

11. A data storage device, comprising:
    one or more memory dies; and
    a controller communicatively coupled to the one or more memory dies and operable to:
       identify a first memory block of the one or more memory dies and a second memory block of the one or more memory dies, the first memory block and the second memory block being associated with each other based, at least in part, on a programming operation;
       detect a failure of the programming operation on the first memory block;
       based on detecting the failure:
          store a first identifier associated with the first memory block and a second identifier associated with the second memory block as an entry in a list of failed memory blocks; and
          identify the first memory block as a failed memory block; and
       based on a determination that a number of entries in the list of failed memory blocks exceed a threshold:
          determine whether the second identifier associated with the second memory block is included in the list of failed memory blocks multiple times; and
          based on a determination that the second identifier associated with the second memory block is included in the list of failed memory blocks multiple times, initiate a memory block recovery process on the first memory block.

12. The data storage device of claim 11, wherein identifying the first memory block as a failed memory block comprises:
    performing a garbage collection process on the first memory block; and
    retiring the first memory block.

13. The data storage device of claim 11, wherein initiating the memory block recovery process on the first memory block comprises:
    performing a program operation on the first memory block;

determining whether the program operation is successful; and based on a determination that the program operation on the first memory block is successful, identifying the first memory block as a valid memory block.

14. The data storage device of claim 11, wherein the controller is further operable to reset one or more of: the entries in the list of failed memory blocks, and a counter that indicates the number of entries in the list of failed memory blocks.

15. The data storage device of claim 11, wherein the controller is further operable to:

determine whether the memory block recovery process is successful; and based on a determination that the memory block recovery process is successful, identify the second memory block as a failed memory block.

16. The data storage device of claim 15, wherein the controller is operable to cause data stored by the second memory block to be relocated to another memory block.

17. The data storage device of claim 11, wherein the second memory block stores control information and wherein the first memory block stores received data.

18. The data storage device of claim 11, wherein the first memory block and the second memory block are associated with one of: a plane of the one or more memory dies, and a metablock that spans multiple memory dies.

19. A non-volatile storage device, comprising:

a controller;

one or more memory dies; and means for initiating a memory recovery process on a first memory means associated with the one or more memory dies and a second memory means associated with the one or more memory dies based, at least in part, on a determination that each of the first memory means and the second memory means failed a programming operation after being associated with a third memory means.

20. The non-volatile storage device of claim 19, wherein the means for initiating the memory recovery process further includes:

means for performing a first program operation on the first memory means and a second program operation on the second memory means;

means for determining whether at least one of the first program operation and the second program operation is successful; and means for identifying at least one of the first memory means and the second memory means as a valid memory means based, at least in part, that at least one of the first program operation and the second program operation was successful.

\* \* \* \* \*